UNITED STATES PATENT OFFICE.

JOSEF HERTKORN, OF BERLIN, GERMANY.

PROCESS OF MAKING IODIN PRODUCTS.

No. 901,709.　　　　　Specification of Letters Patent.　　　Patented Oct. 20, 1908.

Application filed June 1, 1908.　Serial No. 435,890.　(Specimens.)

*To all whom it may concern:*

Be it known that I, JOSEF HERTKORN, doctor of philosophy, chemist, and resident of Berlin, Germany, Paulstrasse 8, have invented a new and useful Improved Process of Making Iodin Products, of which the following is a specification.

My invention relates to a process of making iodin products, and especially those which can be used as a substitute for iodoform.

Iodoform, which is much used in surgery and therapeutics, causes considerable irritation when used on open wounds, and has the additional disadvantage of possessing a very pungent and penetrating odor, especially when exposed to heat. Moreover, the deep yellow stain which iodoform produces on the skin is in some cases injurious. These detrimental properties are in part due to the solubility of the iodoform in the wound secretions. For these reasons, many persons seriously object to the use of iodoform.

My invention is designed to provide substitutes for iodoform which will be free from the disadvantages mentioned above. Such substances leave little or no stain on the skin, their color being substantially the reddish brown or bright yellowish brown of the cicatrix of a wound. On the other hand, they possess excellent and permanent antiseptic properties and are at the same time non-irritant and odorless. According to my invention, these substances are obtained by treating the products of condensation of aldehydes with ketones and their derivatives of both the aliphatic and aromatic series, with iodin or compounds which yield iodin. These substances, therefore, combine the antiseptic property of iodoform with the properties of the unstable aldehyde compounds and of iodin.

The iodized product of condensation of acetone and formaldehyde may be regarded as the chief representative of the iodoform substitutes of the aliphatic series. This product is almost entirely insoluble in water, is soluble in alcohol, ether and amyl-acetate, the resulting liquid being of a yellow color, and is especially soluble in acetone and other ketones, the resulting liquid being then of a deeper yellow color. On the other hand, it is almost insoluble in cold benzin, or benzol, or oil of turpentine, but partially soluble in hot benzin, or benzol, the resulting liquid being of a red rose or brick-red color. This rose coloring, however, does not arise from an actual solution of the substance, but from a partial segregation of the unstably combined iodin, in the presence of heat. The solutions of this product in alcohol or acetone, when soda or an alkali are added and the whole heated, are characterized by a smell of iodoform and by the precipitation of iodoform, the liquid then losing its color. The iodin in these products is introduced partly as a substitution product and partly as an addition product, according to the method adopted and the particular reagents used. If the iodin is added to an acid or neutral liquid, addition products are mainly formed. If the iodin is added to an alkaline solution, substitution products preponderate. The former products when they are dried are reddish brown in color, and of a compact and horny nature, while the latter are yellow or yellowish brown in color and softer. The iodin addition products liberate iodin at normal temperatures, and these products when heated remain pulverulent and are only carbonized at a high temperature. The iodin substitution products, however, become softened by heat, and when heated on a platinum foil or in a retort give off a strong odor of iodin and formaldehyde.

The physical, chemical, and antiseptic properties of the iodized condensation products formed from the higher aldehydes and ketones or their derivatives of both the aliphatic and aromatic series are in general identical with or very similar to those of the lower aldehydes and ketones. A condensation product as normally produced, still contains a large percentage of uncondensed aldehyde, as much as 50 per cent., for example, combined with alcoholic alkali, potash, for example. The more aldehyde the iodized condensation product contains in a combined form, the lighter is its color and the more iodin it contains. The amount of iodin contained in these products varies from 15 to 46 per cent., according to the methods and reagents used. The absorption of iodin is at its lowest limit in an acid liquid, and at its highest limit in an alkaline liquid.

The condensation of the aldehydes with the ketones or their derivatives may, for the purpose of this invention, be effected in various way. Thus the aliphatic or the aromatic compounds may be taken either separately or together, or in the latter case in any desired ratio of the one to the other, and to the aqueous or alcoholic alkalies, acids, carbonates, or other salts having a condensing action on such compounds. These condensation products are either colorless or white, or of a yellowish or deep orange color, according to the nature of the condensing agent and the manner of using it.

Instead of the simple lower or higher aldehydes and ketones, the polymerized or condensed aldehydes or ketones may be used, as may also the substitution products, oxyaldehydes, ketonic alcohols and the like. Examples of these are trioxymethylene, paraldehyde, metaldehyde, avdol, croton-aldehyde, chloral, salicyl-aldehyde, cinnammic aldehyde and the like, or mesityl-oxid, phorone, chlor-acetone, anthraquinone, benzoyl-carbinol and the like.

For iodizing the condensation products, the iodin may be used either in the form of a powder or in solution. In the former case, the iodin is stirred up in an alkaline, neutral, or acid liquid. In the latter case, an alcoholic or iodin-hydrocarbon solution may be used. Still other ways are a solution of iodin in iodid of potash, iodin in iodic acid, iodin in hydriodic acid or the like. Other iodin-yielding substances either with or without the addition of an alkali or a carbonate or bicarbonate, may also be used.

The condensation and iodization may be advantageously carried out in one operation.

Example 1. A mixture is made of 100 grams of acetone or some other ketone with about 250 grams of 40 per cent. of formaldehyde in from one-half to 2 liters of water. To this mixture is then added from 30 to 60 grams of soda lye, and the mixture is gently heated until spontaneous heating sets in, and the liquid assumes a yellow color. The liquid is then cooled, whereupon condensation takes place, and is left to stand for from one to two days, being frequently stirred or shaken. In this way, an orange - yellow, flocculent precipitate is formed. If the temperature rises higher, compact, orange-red lumps are formed, which even when heated to a higher degree of heat do not soften, and which when iodization is effected, yield an iodin addition product which is of a horny and compact nature. The mixture is then heated to from 40 to 50° C. and the heating is continued until the yellow precipitate has been completely deposited. The liquid is then allowed to stand and cool off for a considerable time. The precipitate is then separated from the liquid, pulverized, and thoroughly washed with water. The air-dried or still moist and finely powdered condensation product is covered with a layer of light benzin, and to it is added from one-half to an equal quantity of iodin and the mass is warmed for from 12 to 24 hours at a temperature of about 40 to 60° C. on a water bath under a reflux condenser. Sometimes the reaction may be aided if an equal weight or half of the weight of the iodin, of powdered crystalline soda or potash, or bicarbonate be gradually added, until effervescence no longer takes place. Should the quantity of iodin prove too small, additional iodin is added until the benzin is permanently colored red. The reddish brown precipitate is washed with benzin and water, and then dried either in the air or at a temperature of from 30 to 40° C. and pulverized. It contains about 28 per cent. of iodin.

Example 2. The liquid and precipitate obtained according to Example 1, before the addition of the benzin, is treated with carbon dioxid up to the point of saturation for the purpose of neutralizing the lye; or for the same purpose, the mixed product is first subjected to a current of warm air and from 80 to 100 grams of carbonate of soda or potash is dissolved in the liquid. 100 grams of iodin are then gradually stirred into the liquid, which is heated at from 40 to 60° C. on a water bath in a closed vessel under a reflux condenser until the iodin is entirely combined with the precipitate. In order to secure complete saturation with iodin, additional iodin in small amounts is added from time to time until the liquid is permanently colored red, and the whole of the alkali decomposed. The yellowish brown precipitate is filtered off, washed with cold water until it is free from alkali, dried at a temperature of from 20 to 30° C. and the product pulverized to a fine flour. The latter contains about 40 per cent. of iodin.

Example 3. 1000 grams of dry, very finely powdered white condensation product formed by treating acetone and formaldehyde with soda as in Example 1, are stirred into three liters of water, and mixed with 1000 grams of iodin in the form of a concentrated solution of iodin and potassium iodid, the liquid being frequently stirred meantime. The mass is then heated on a water bath to a temperature of from 40 to 50° C. and powdered bicarbonate of potassium is added in small amounts from time to time, from 500 to 600 grams of this reagent being required, and the liquid is maintained at the same temperature from 2 to 5 hours more, stirring being constantly kept up. The mass is then allowed to cool down completely. The product is drawn off by suction, washed with cold water, dried at a temperature of from 20 to 30° C. and reduced to a fine powder. This powder contains 30 per cent. of iodin.

Example 4. 30 grams of condensation product obtained from acetone and formaldehyde with alcoholic lye (prepared as in Example 1, except that, instead of soda, alcoholic lye is used) are mixed with 7.2 grams of iodin and the whole mass thoroughly pulverized, said mass being then mixed with 12 cm³ of a solution of iodic acid, one cm³ of this solution containing 0.20826 grams of $HIO_3$ in 15 cm³ of water. The mass is then diluted with 115 cm³ of water, and heated on a water bath to 45° C., after which 16.8 grams of iodin and 28 cm³ of iodic acid are added, and the mass kept for 30 hours at a temperature of from 45 to 50° C. while being frequently shaken. The precipitate is removed by suction and washed and dried in the air, resulting in the production of 50.2 grams of a reddish brown iodin product, smelling strongly of iodin and containing 36.03 per cent. of iodin. In this method, the hydriodic acid set free in the substitution reaction may at once be converted into iodin and water under the action of the iodic acid, a calculated amount of which is added. As, however, besides the substitution, an addition of iodin also takes place, the iodin being in this reaction removed without the formation of hydriodic acid, the liquid becomes slightly acid owing to the presence of free iodic acid. The reaction takes place according to the following equations:

(1) $5R.H + 10I = 5R.I + 5HI$
(2) $5HI + HIO_3 = 3I_2 + 3H_2O$, in which R.H represents the product of condensation and R.I the iodin product.

Example 5. To 20 grams of condensation product obtained as in Example 1 are added 22.1 cm³ of iodic acid, and then 50 cm³ of hydriodic acid containing 44 per cent. of HI. 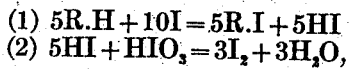 The brown mass is then pulverized and diluted with 50 cm³ of water and heated on a water bath for 22 hours at a temperature of from 45 to 50° C. The iodin product is drawn off, washed, and dried as usual, and contains 29 grams. It is deep brown in color and has a slight smell of iodin, and contains 24.58 per cent. of iodin.

Example 6. 20 grams of condensation product obtained as in Example 1 are pulverized with 100 cm³ of hydriodic acid and mixed with 22.1 cm³ of iodic acid. The mixture is then heated on a water bath for 10 hours at a temperature of from 45 to 50° C., being shaken frequently. The mass is then cooled down, the precipitate removed, washed, and dried at ordinary temperatures, the result being 29 grams of brown colored iodin product containing 25.7 per cent. of iodin. There is no loss of iodin in these examples, as the whole is recovered in the washing liquors.

Example 7. A reddish brown iodin product containing 45.6 per cent. of iodin may be obtained from benzylidene-acetone and benzaldehyde, when condensed and iodized according to Example 4. This product is an iodized dibenzylidene-acetone.

Example 8. A reddish brown iodin product containing 30.7 per cent. of iodin may be obtained from phorone and an excess of formaldehyde, and condensed with aqueous soda lye according to Example 1, and iodized according to Example 3.

Example 9. A reddish brown iodin product containing 34.6 per cent. of iodin may be obtained from craton aldehyde and acetone when obtained as in Example 1 and iodized according to Example 3.

Example 10. A reddish brown iodin product containing 32.54 per cent. of iodin may be obtained from mesityl oxid and formaldehyde, obtained as in Example 1 and iodized as in Example 3.

Example 11. An iodin product containing 35 per cent. of iodin, readily fusible and with a slight odor, may be obtained from benzaldehyde and acetone obtained as in Example 1 and iodized as in Example 4.

Example 12. Acetone and synthesized salicyl aldehyde obtained as in Example 1, when iodized as in Example 3, produce a product containing 35 per cent. of iodin.

In carrying out this process, I have found that the iodizing of the condensation products in closed vessels, especially if these vessels are provided with reflux condensers, yields a product containing a considerably higher percentage of iodin than when conducted in open vessels.

In addition to the accretion of aldehyde to the normally obtained condensation product by means of alcoholic alkali, the quantity of iodin absorbed can be still further increased by first completely carrying out the iodization by the substitution method in an alkaline liquid and subsequently terminating the same by an addition method in an acid liquid. To effect this result, the iodid of potassium formed is decomposed with dilute acid and the hydriodic acid that is set free is converted in free, active iodin by the addition of a weak oxidizing medium, such as chlorid of iron, iodic acid, or the like. This method is generally applicable for iodization in a neutral or acid liquid, any hydriodic acid that is formed being decomposed as quickly as it is formed into free and immediately active iodin. If the iodin, or any hydriodic acid that may be formed be added, instead of the double compound being formed, it may happen that no free hydriodic acid is formed I do not limit myself to the exact mediums for dissolving and separating iodin above described, as other mediums which will produce the same effect may be used, and similarly instead of the aldehydes and ketones mentioned above, there may be used all other aldehydes and ketones or their derivatives having the same or similar properties for the purpose in question.

I claim:—

1. The herein described process for making products containing iodin, which consists in treating the condensation products of aldehydes and ketones with iodin-yielding substances, substantially as described.

2. The herein described process for obtaining products containing iodin. which consists in condensing a mixture of an aldehyde and a ketone, and treating the product with a substance which under heat will yield iodin, substantially as described.

3. The herein described process for making products containing iodin, which consists in condensing a mixture of an aldehyde and a ketone by means of an alkali, separating the precipitate, warming the same with benzin, and adding thereto an iodin-yielding substance, heating the mass, and purifying the product obtained, substantially as described.

In testimony, that I claim the foregoing as my invention, I have signed my name in presence of two witnesses, this 19th day of May 1908.

JOSEF HERTKORN.

Witnesses:
WOLDEMAR HAUPT,
HENRY HASPER.